Figure 1:
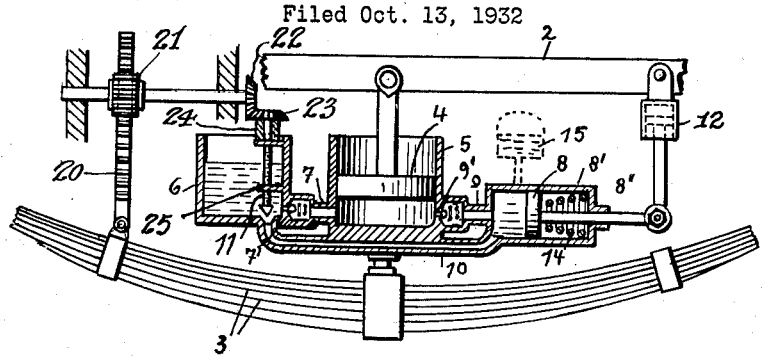

Nov. 27, 1934.   H. PIEPER   1,982,398
REGULATING DEVICE FOR DAMPERS FOR ELASTIC VEHICLE SUSPENSIONS
Filed Oct. 13, 1932

Patented Nov. 27, 1934

1,982,398

UNITED STATES PATENT OFFICE 1,982,398

REGULATING DEVICE FOR DAMPERS FOR ELASTIC VEHICLE SUSPENSIONS

Henri Pieper, Brussels, Belgium

Application October 13, 1932, Serial No. 637,629
In Belgium October 17, 1931

6 Claims. (Cl. 267—31)

The invention relates to a device for damping the deformations of the elastic suspension of vehicles.

Pneumatic and hydraulic devices are already known in which the damping of the oscillations of vehicle suspensions is obtained by means of two elements forming a piston and cylinder and the one of which, for instance the piston, is connected to the one member of the suspension, for instance to the vehicle frame, whilst the other element, for instance the cylinder, is attached to the second member of the suspension i. e. to the vehicle axle.

Furthermore suspension devices exist in which the tightness of the suspension and particularly the braking action of the shock-damper depends on the vehicle speed or is controllable by hand. Also pneumatic damping arrangements are already in use in which the energy of the oscillations of the suspension is utilized for modifying the tightness of a device comprising piston, cylinder and air pad in dependence on the amplitude of the oscillations.

All these devices are defective because they do not simultaneously and automatically adapt themselves to the vehicle speed and to the state of the road or they do not act in conformity to the frequency and amplitude of the oscillations and do not follow in a rapid and proportional manner the variations of the state of the road or the passages of the vehicle wheels through holes or other defects of the road.

The invention has for an object to avoid these drawbacks and to produce an automatic variation of the tightness of a vehicle suspension in proportion to the stroke effected by the one suspension member relatively to the other i. e. in proportion to the frequency and amplitude of the oscillations or deformations of the suspension and thereby to the vehicle speed as well as to the road state and to the vehicle load so as to guarantee at any instant a favorable running of the vehicle on the road.

According to the invention this result is obtained by reason of the fact that the suspension of the vehicle is combined with a pump which draws in from a reservoir and forces to a receiver through an automatic valve an incompressible liquid in quantities proportional to the stroke of the one suspension member relatively to the other. The piston of the pump may be connected for instance to the frame of the vehicle and the pump cylinder to the vehicle axle and the receiver may be constituted also by a cylinder and a piston and the displacement of this piston produces an increase of the tightness of the suspension.

The receiver cylinder is provided with an outlet orifice of small section which may be variable, preferably in dependence on the weight of the vehicle frame. The cross-sectional area of this orifice has such small dimensions in respect to the cross-sectional area of the pump cylinder that the pressure stroke of the pump piston charges the receiver but that the escape of liquid through the small outlet orifice of the receiver cannot rapidly counteract this action of the pressure stroke of the pump piston. Consequently the pressure in the receiver cylinder depends on the liquid supply furnished by the pump in a given time and this liquid supply is the larger as the state of the road is more defective and as the vehicle runs more rapidly.

Whilst in the known hydraulic damping devices combined to vehicle suspensions the pressure of the liquid varying in conformity to the flexings of the suspension springs oscillates between the value zero and another certain value depending on the state of the road, according to the invention a certain intermediate pressure is maintained in the receiving cylinder as long as the vehicle axles are subjected to vertical displacements. This action of the receiver cylinder augments the friction in the case of damping devices working by friction and stiffens or tightens the springs of the suspension and thereby produces an automatic regulation of any damping device.

The utilizing of the receiver pressure for stiffening the suspension may be effected by having the receiver piston act upon auxiliary plate springs or upon the controlling member of the shock-dampers for instance the damping nut of the shock-dampers working by friction or upon the closing member controlling the passage of the liquid in hydraulic shock-dampers. The receiver piston is connected to a return spring, for instance a helical spring, or to the auxiliary plate springs so as to produce a slow escape of the incompressible liquid through the outlet orifice of small section and to assure the highest degree of elasticity of the suspension until, eventually, a new working of the pump tends to augment the stiffness of the suspension.

On a given road and for every vehicle speed there is rapidly established in the receiver a working pressure having the same value as long as the state of the road and the speed of the vehicle remain the same. Consequently the stiffness or tightness of the suspension influenced by this pressure is automatically adapted to the road state and the vehicle speed. The piston of the receiver upon which this pressure acts permanently brakes more or less the springs of the damper so as to diminish the oscillations of the vehicle axle.

According to the invention, the stiffness of the suspension of the vehicle may be regulated also in dependence on the load of the vehicle by using the variations of the flexings of the suspension device for acting, for instance by means of levers upon a valve controlling the outlet orifice of the receiver cylinder. Furthermore, in the case of a self-propelling vehicle a single regulating device according to the invention may be employed and the receiver piston of this device may be connected to each of the four shock-dampers of the vehicle or there may be arranged upon the vehicle two or four separate devices constructed according to the invention, each acting upon one of the axles or of the extremities of the axles.

Figure 3:
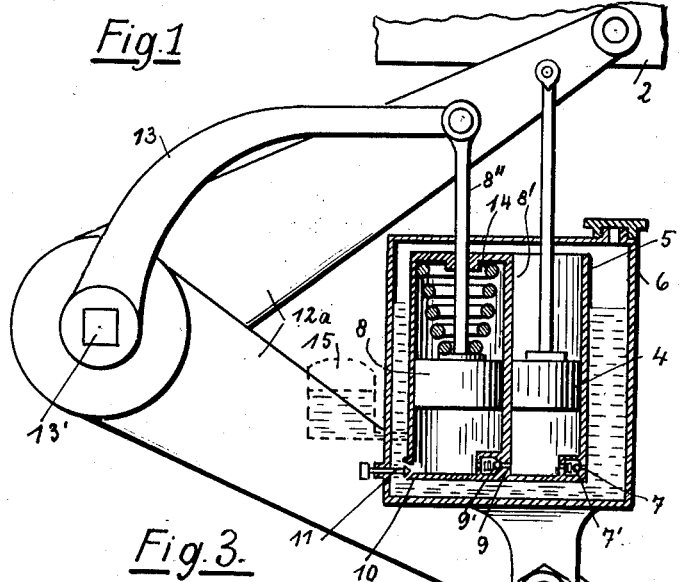
Figure 2:
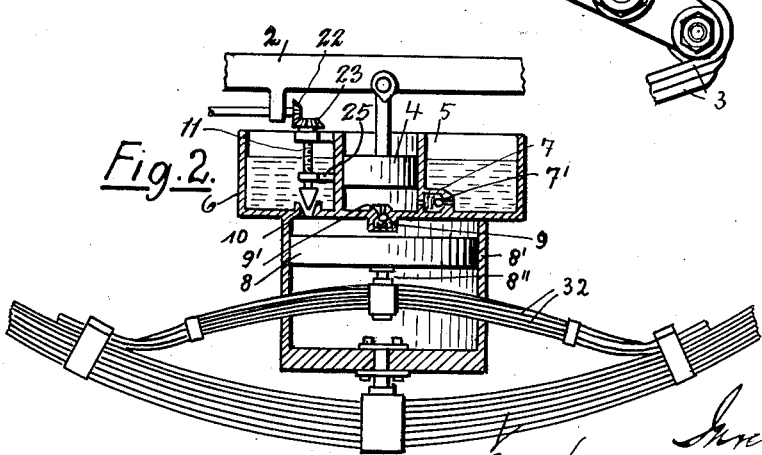

The accompanying drawing shows by way of example several embodiments of the invention. Figure 1 is a schematic representation of the whole damping and regulating device according to the invention. Figure 2 illustrates the application of the invention to a self-propelling vehicle the suspension springs of which are combined to auxiliary plate springs. Figure 3 shows an embodiment of the invention in the case of a vehicle suspension provided with a shock-damper working by friction. The corresponding elements of the three figures are designated by the same numerals.

Figure 1 shows the two parts of an elastic vehicle suspension, namely the frame 2 and the laminated leaf spring 3. The spring 3 carries the axle (not shown) of a self-propelling vehicle. The piston 4 of a pump is articulated to the frame 2 whilst the pump cylinder 5 is attached to the laminated spring 3 and follows the displacements of this spring. A reservoir 6 contains an incompressible liquid, for instance water or oil and is in communication with the pump cylinder 5 by means of the pipe 7 containing an automatic valve 7' opening towards the cylinder 5.

A piston 8 and a cylinder 8' form a receiver which is connected to the pump cylinder 5 by means of a pipe 9 containing an automatic valve 9' opening towards the receiver cylinder 8'. A pipe 10 of a relatively small diameter connects the cylinder 8' with the reservoir 6 open to the atmosphere. The effective area of this throttle-pipe 10 may be regulated for instance by means of an adjustable pin 11 carrying a cone valve controlling the entrance opening of the pipe 10 at the bottom of the reservoir 6.

The pin 11 may be adjusted by hand before the start of the vehicle in conformity to the load of the vehicle in order to regulate the working of the device according to the load. Also an automatic adjusting of the pin 11 may be effected by controlling the movement of the pin 11 by means of gearing 20, 21, 22 and 23, which is influenced and moved by the variations of the flexure of the vehicle suspension. The rack 20 is connected to the spring 3 and actuates the toothed wheel 21 which transmits its rotation by means of the conical wheel 22 to the conical wheel 23 fixed to a square tube 24 engaging the square upper end of the valve pin 11. This pin 11 is guided by means of an exterior screw thread in the fixed bracket 25 and enabled to slide axially into the square tube 24 so that the valve cone fixed to the lower end of the pin 11 can execute also a relative axial movement with respect to the tube 24 when being rotated by this tube. The rod 8'' fixed to the receiver piston 8 is articulated to a shock-damper 12 not shown in detail, to auxiliary springs or to a similar device so as to vary and increase the stiffness of the suspension when displaced toward the right hand.

Figure 2 shows the application of the invention to the case where the vehicle suspension comprises, besides the laminated spring 3, also an auxiliary leaf spring 32 to which is connected the rod 8'' of the receiver piston 8. The cylinders 8' and 5 and the reservoir 6 are carried by the spring 3 to which they are attached whilst the pump piston 4 is articulated to the vehicle frame 2.

According to Figure 3 the rod 8'' of the receiver piston 8 is articulated by means of a lever 13 to the clamping nut 13' of a shock-damper 12a working by friction and being of any known construction. The cylinders 5 and 8' and the reservoir 6 are connected as in the case of Figure 2 to the suspension spring 3 and the pump piston 4 is articulated to the vehicle frame 2. A receptacle 15 containing air may be connected as shown in dotted lines in Figure 3 and 1, to the receiver cylinder 8' in order to obtain a regular working of the whole device by means of this air-chamber.

The operation of the devices shown by Figures 1 to 3 is as follows: The pump piston 4 draws in, during each suction stroke, incompressible liquid from the reservoir 6 into the pump cylinder 5 through the pipe 7 and the valve 7' and it forces, during each pressure stroke, liquid from the pump cylinder 5 into the receiver cylinder 8' through the pipe 9 and the valve 9' and the quantity of liquid pumped into the receiver cylinder 8' is proportional to the amplitude of the displacements of the suspension spring 3. The receiver piston 8 is displaced to the right hand to an extent corresponding to this pumping action against the action of a return spring, for instance of the helical spring 14 of Figure 1 and 3 or of the auxiliary leaf spring 32 of Figure 2, whereby an increase of the tightness of the suspension is obtained.

In consequence of the small diameter of the escape pipe 10 connecting cylinder 8' and reservoir 6, the return spring 14 or 32 can replace but relatively slowly the receiver piston 8 into a position for which the tightness of the suspension is less and this takes place when the pumping action of the piston 4 decreases or ceases. After one stroke or a plurality of strokes of the pump piston 4, therefore, there is established in the receiver cylinder 8' a working pressure which depends on the road state and the vehicle speed i. e. the output of the pump 4, 5.

In this way, the tightness of the vehicle suspension is automatically adapted by the action of the receiver piston 8 to the road state and the vehicle speed whereby a favorable working of the suspension is assured at each vehicle speed and upon each road. At the same time the further advantage is obtained that the regulating device, according to the invention, provides also an automatic correction of a defective working of the shock-dampers which is produced by a variation of the coefficient of friction in the case of mechanical shock-dampers or by a variation of the coefficient of viscosity in the case of hydraulic shock-dampers.

The invention may be embodied in detail also in a manner differing from that of the examples shown in the accompanying drawing in order to be adapted to the particularities of the case of application, without departing from the spirit and scope of the invention or sacrificing any of its advantages in the meaning of the appended claims.

I claim:

1. A regulating device for dampers for elastic vehicle suspensions comprising in combination a pump having its piston connected to the vehicle frame and its cylinder to the vehicle axle, a reservoir, an incompressible liquid contained in said reservoir, a conduit connecting said reservoir to said pump cylinder, a check valve arranged in said conduit and opening towards said pump cylinder, a receiver constituted by a cylinder and a piston, a conduit connecting said receiver cylinder to said pump cylinder, a valve inserted in said latter conduit and opening towards said receiver cylinder, another conduit connecting said receiver cylinder and said reservoir and having a diameter relatively small with respect to the diameter of said conduit connecting said receiver to said pump cylinder, a return spring acting upon said receiver piston and means adapted to connect said receiver piston to said vehicle suspension to increase its resistance when displaced by the action of said pump.

2. A regulating device as set forth in claim 1 characterized by an adjustable pin and a cone attached to the one end of said pin, said pin and said cone being arranged in such relation to the conduit of small diameter that flow through the conduit can be varied by adjusting said pin.

3. A regulating device as set forth in claim 1 characterized by having a pin and cone valve regulating the flow through the conduit of small diameter and further characterized by means for adjusting the pin carrying the cone by the action of the variations of the deflection of the vehicle suspension in dependence on the load of the vehicle.

4. A regulating device as set forth in claim 1 characterized by the return spring being formed by an auxiliary leaf spring combined to the suspension spring and acting upon the receiver piston.

5. A regulating device as set forth in claim 1 characterized by the fact that the communication between the receiver cylinder and the reservoir containing the incompressible liquid is established by the aid of the pump cylinder the piston of which is attached to the one of the two members of the vehicle suspension whilst the receiver cylinder, the pump cylinder and the reservoir are carried by the other member of the suspension.

6. A regulating device as set forth in claim 1 in which a shock-damper is combined with the vehicle suspension characterized by the fact that the receiver piston is articulated to the controlling member of said shock-damper so as to increase the resistance of the shock-damper when said piston is displaced by the action of the pump.

HENRI PIEPER.